United States Patent [19]

Hoffman et al.

[11] 3,894,129

[45] July 8, 1975

[54] METHOD OF MANUFACTURE OF STRAIN FREE CONTACT LENSES

[75] Inventors: Donald O. Hoffman, Sturbridge; Edward Z. Zdrok, Webster, both of Mass.

[73] Assignee: American Optical Corporation, Southbridge, Mass.

[22] Filed: Mar. 15, 1973

[21] Appl. No.: 341,614

[52] U.S. Cl. .................................... 264/1; 260/885

[51] Int. Cl.² .................................... B29D 11/00

[58] Field of Search ................. 264/1, 331; 260/885

[56] References Cited

UNITED STATES PATENTS

| | | | |
|---|---|---|---|
| 2,511,436 | 6/1950 | Kauth | 264/102 |
| 3,265,763 | 8/1966 | Deichert et al. | 260/872 |
| 3,361,858 | 1/1968 | Wichterle | 264/1 |
| 3,413,391 | 11/1968 | Carroll et al. | 264/102 |
| 3,496,254 | 2/1970 | Wichterle | 264/1 |
| 3,621,079 | 11/1971 | Leeds | 264/1 |
| 3,639,524 | 2/1972 | Seiderman | 264/1 |
| 3,700,761 | 10/1972 | O'Driscoll | 264/1 |
| 3,761,208 | 9/1973 | Boudet et al. | 264/1 |
| 3,792,028 | 2/1974 | Seiderman | 260/885 |
| 3,807,398 | 4/1974 | Grucza | 264/1 |

*Primary Examiner*—Robert F. White
*Assistant Examiner*—Gene Auville
*Attorney, Agent, or Firm*—Alan H. Spencer; William C. Nealon

[57] ABSTRACT

A dispersion of a hydroxy methacrylate ester and a poly vinyl pyrrolidone (with low and medium temperature initiators) is cast in a shaping mold and is polymerized in the absence of oxygen by a low temperature thermal polymerization followed by a higher thermal post polymerization. The resultant material may be shaped into a contact lens form, and these lenses may then be equilibrated by hydrating in normal saline solution.

11 Claims, 8 Drawing Figures

METHOD OF MANUFACTURE OF STRAIN FREE CONTACT LENSES

BACKGROUND OF THE INVENTION

The present invention relates to improvements in the fabrication of soft plastic lens blanks, and specifically provides an improvement on the method set out in the U.S. Pat. No. 3,700,761 issued to Kenneth F. O'Driscoll, et al., for "Fabrication of Soft Plastic Contact Lens Blanks and Composition Thereof." More particularly, the present invention is directed to the manufacture of strain free, soft contact lenses. In the above mentioned patent, graft or block polymers of hydroxy alkyl methacrylate esters and polyvinyl pyrrolidone are cast in a shaping mold with a two stage polymerization in the presence of low and medium temperature free radical initiators. The method, also, includes a post polymerization irradiation to harden the lens, and then a hydration process for hydrating the plastic lens to a salinity approximately equal to that of the human eye.

In general, the method of the present invention consists of polymerizing a mixture of hydroxy alkyl methacrylate esters and a polyvinyl pyrrolidone in the presence of free radical initiators, but in the absence of oxygen. It has been found to be desirable to exclude oxygen from the reaction mixture for a variety of reasons including (1) the fact that oxygen poisons the polymerization system slowing it down, (2) some of the constituents of a batch will vaporize during thermal polymerization causing a change in a concentration of the prepolymer mixture and thus the chemistry of the product button and lenses made therefrom, which are then unpredictable, (3) since the hydroxy alkyl methacrylate ester is the primary constituent which volatizes, the minor percentages of other constituents such as the catalyst, for example, will increase, etc. The products of polymerization from which oxygen is excluded are more uniform and the water content of hydrated lens from batch to batch will be essentially the same, there is more uniformity of color from batch to batch, etc.

DESCRIPTION OF THE INVENTION

Included among the objects and advantages of the present invention is a process producing essentially strain free buttons of a polymer from which soft contact lenses may be cut.

Another object of the invention is to provide a process for producing essentially strain free soft contact lens blanks.

A still further object of the invention is to provide a method of producing soft contact lens blanks in which the precursors of the finished plastic material are polymerized in the absence of oxygen to produce an essentially strain free contact lens blank which is readily reproducible from batch to batch.

Yet another object of the invention is to provide a method of producing contact lens blanks in which the polymerization of the precursors of the blank are polymerized in the absence of oxygen to produce a uniform product from batch to batch and in which the water content of hydrated material is the same from batch to batch.

An additional object of the invention is to provide a process for the manufacture of strain free, soft contact lens blanks in which the precursors of the desired polymer are covered and sealed in a mold by a paraffin wax or the like to thereby exclude oxygen from the materials during thermal polymerization.

A still further object of the invention is to provide a method for producing strain free, soft contact lens blanks wherein a paraffin or like cover for the precursors of the polymerization may be easily inserted in the mold used for forming a polymerized blank or used as a flat cover for the mold.

These and other objects and advantages of the invention may be ascertained by reference to the following description and appended illustrations in which.

Figure 7:
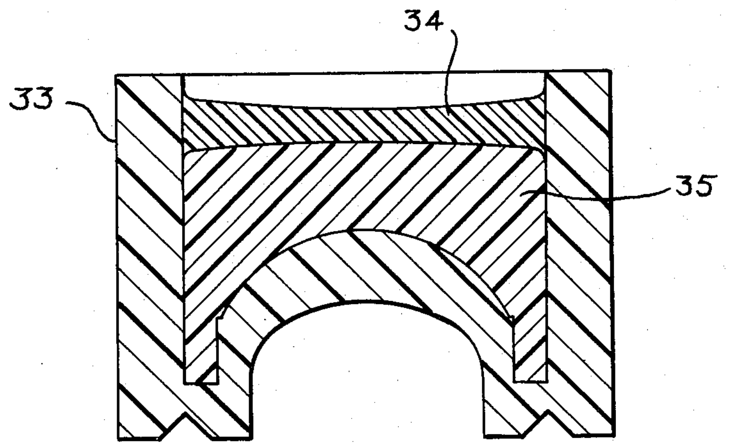
Figure 8:
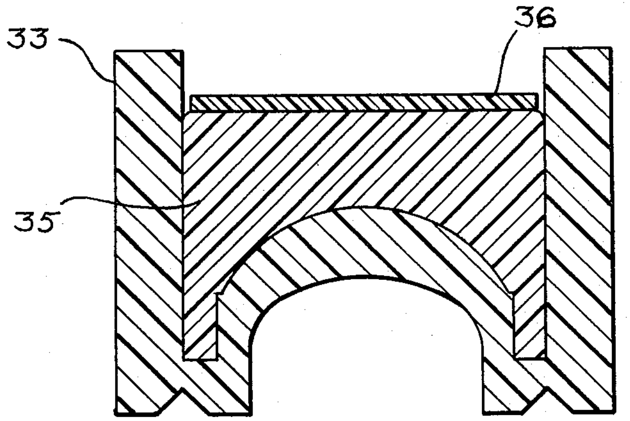

FIG. 7 is a cross-sectional view of another embodiment of the present invention showing a contact lens button mold with the polymer precursors in place and paraffin sealing the pre-polymer from the air; and FIG. 8 is a cross-sectional view of another embodiment of the present invention showing a contact lens button mold with the polymer precursors in place and a loose-fitting inert, non-adherent plastic disc cover substantially excluding air from the precursors.

Figure 4:
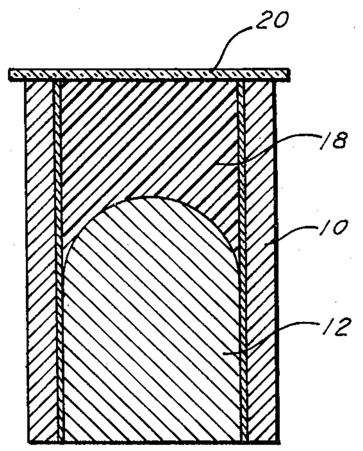
FIG. 4 is a cross-sectional view of the mold of FIG. 3 showing seating of the cover plate during polymerization.
Figure 5:
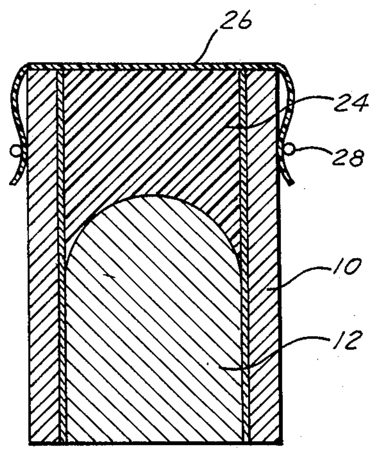
FIG. 5 is a cross-sectional view of a contact lens button mold showing the polymer precursors in place and a flexible membrane sealing the pre-polymer from the air.

According to the present invention, there is provided a tough, hard, fluid-permeable material from which contact lenses may be cut, producing essentially strain free contact lenses. Such lenses, from batch to batch, are uniform in imbibed water content, the same color, etc. The composition is the result of polymerization of from 20–45 percent by weight of a solid, high molecular weight polyvinyl pyrrolidone and from 80–55 percent by weight of a hydroxy alkyl methacrylate ester which preferably contains less than 1.5% of methacrylic acid and not more than 0.7% of an alkyl glycol dimethacrylate. The thermal polymerization is conducted in two stages with oxygen excluded during both stages. The first stage is conducted using a low temperature peroxide catalyst such as acetyl peroxide, di (secondary-butyl) peroxy dicarbonate, cyclohexanone peroxide, etc., and the second stage polymerization is conducted using a medium temperature free radical initiator such as benzoyl peroxide, diethyl peroxide, asoisobutyronitrile, orthotolyl peroxide, etc. The first polymerization temperature is maintained at about 40°–60°C for a period of 2 to 24 or more hours, and the second polymerization temperature is maintained at about 90°–120°C for a period of from about ½ to over 2 hours. Examples of covers which are suitable for excluding oxygen include disks of polyethylene, neoprene, and EPOLENE N. The covers may either fit as shown in FIGS. 4 or 5, or be inserted into the top of the mold and float on the polymer precursors similar to paraffin as shown in FIG. 7. Normally, after the two stage polymerization, the resultant button having been removed from the mold and separated from its oxygen excluding cover is machined, ground, and polished to approximately the shape of the desired contact lens. This lens is then hydrated in a normal or isotonic saline solution. The resultant lens blanks, which are formed by polymerization with oxygen excluded, produce strain free soft contact lenses, which are very uniform from batch to batch so that each lens will have the same water content on hydration and the lenses will be of the same color.

EXAMPLE I

Figure 1:
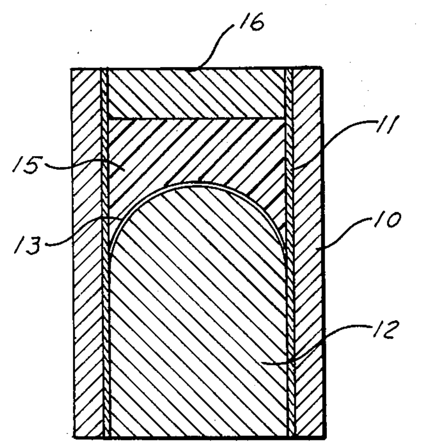
FIG. 1 is a cross-sectional view of a filled mold for producing polymerized buttons from which contact lenses may be made including a paraffin covering thereof.
Figure 2:
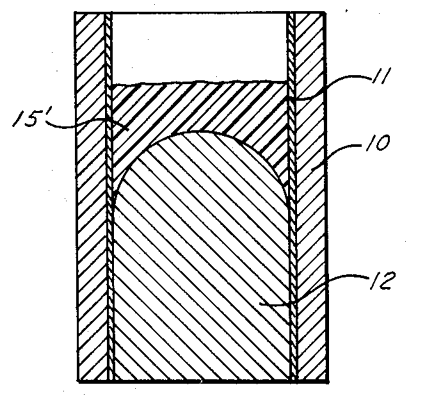
FIG. 2 is a cross-sectional view of FIG. 1 subsequent to a thermal polymerization of the polymer precursors therein and without the paraffin cover.
Figure 3:
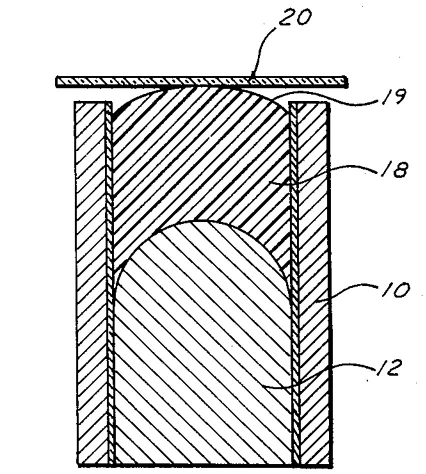
FIG. 3 is a cross-sectional view of a mold filled completely full of the precursors for a soft contact lens polymer, showing a cover plate placed on the meniscus of the material.

In one form of the invention, a paraffin wax is used to cover the precursors of the polymer for the contact lens. As shown in FIGS. 1 and 2, a mold cylinder 10 coated with teflon 11, or Dri Film (a General Electric Trademark) or the like, has a male mold portion 12 which, likewise, includes a coating 13 on its tip in contact with the polymer precursors. The female mold 10 extends beyond the point for containing the pre-polymer material and the top above such material is filled with a liquid paraffin using an eye dropper to completely fill the volume above the pre-polymer material 15. The material 15, in one form, is a fluid mixture of about 78.24% of 2-hydroxy ethyl methacrylate, about 20.00% of polyvinyl pyrrolidone, about 0.56% ethylene glycol dimethacrylate and 1.2% of methacrylic acid, all the percentages by weight percent. The mixture was catalyzed with about 0.3 weight percent of di (secondary-butyl) peroxy dicarbonate and about 0.3 weight percent of benzoyl peroxide. The mixture was placed in a conventional air oven and cured overnight at about 40°C. The temperature of the oven containing the mold was then rapidly raised to about 110°C, and it was maintained at that temperature for about an hour and a half. At the end of the polymerization period, the mold was removed from the oven and taken apart by an arbor press forced against the male member 12 to remove the lens blank 15, which is now a hard solid plastic member, and the paraffin cover 16.

EXAMPLE II

In another preferred embodiment of the invention, paraffin wax is used to cover the precursors of the polymer for the contact lens. As shown in FIG. 7, an uncoated polyethylene mold 33 extends beyond the point for containing the pre-polymer material and the top above such material is filled with a liquid paraffin 34 using an eye dropper to completely fill the volume above the pre-polymer material 35. The material 35 is a fluid mixture of about 78.24% of 2-hydroxy ethyl methacrylate, about 20.00% of polyvinyl pyrrolidone, about 0.56% ethylene glycol dimethacrylate and 1.2% of methacrylic acid, all the percentages by weight percent. The mixture was catalyzed with about 0.1 weight percent of di (secondary-butyl) peroxy dicarbonate and about 0.1 weight percent of benzoyl peroxide. The mixture was placed in a conventional air oven and cured overnight at about 40°C. The temperature of the oven containing the mold was then rapidly raised to about 110°C, and it was maintained at that temperature for about an hour and a half. At the end of the polymerization period, the mold was removed from the oven and taken apart by an arbor press forced against the male member 12 to remove the lens blank 15, which is now a hard solid plastic member, and the paraffin cover 16.

EXAMPLE III

Following the procedure of Example II, 100 paraffin covered molds were formed, which included as precursors, the polyvinyl pyrrolidone, hydroxy ethyl methacrylate and catalysts of Example I in addition to 1% by weight of glycerol. The buttons were cured by standing overnight at 40°C in an air oven, and the oven was then heated in about a half an hour to about 110°C. The buttons were cured for an additional hour and a half at the 110°C. The heat for the oven was then turned off. The oven was cooled for a period of about four hours and the molds were then removed. This produces equivalent buttons to that of Example I. It is noted that in adding the paraffin by an eye dropper the outlet of the dropper should be near the wall of the top of the cup so that the paraffin stays on the surface of the pre-polymers.

EXAMPLE IV

Following the procedure of Example II, but using 0.1% t-butyl peroctoate and 5% water in place of the benzoyl peroxide, 30 buttons were cast with essentially equivalent results.

EXAMPLE V

Following the procedure of Example II, a loose-fitting polyethylene disc 36, about 0.030 inches thick, was placed on top of the pre-polymer mix, as shown in FIG. 8. The polymerization was carried out in a manner similar to that of Example II, in that the pre-polymer ingredients were initially cured at about 40°C for 4 hours, and subsequently post cured at about 110°C for about an hour and a half. Following the final curing, the contact lens button, the central portion of the mold 33 consisting of the base curve form and the polyethylene cover are removed from the mold shell by a punch. The cover and portion of the mold are easily separated from the button which is then machined in a conventional manner to the desired unhydrated contact lens form. It is desirable to use disks which are slightly less in diameter than the inside diameter of the contact lens button mold. The small gap created by the difference in diameters is desirable to permit the disk to follow the polymer precursors as they shrink during polymerization. Since shrinkage during polymerization is in the order of about 10%, a tight fitting cover would cause substantial distortion of the mold; voids within the polymerized product, or gas containing oxygen to leak between the disk and mold as polymerization progressed.

EXAMPLE VI

A female mold 10 with the male mold portion 12 inserted, FIG. 5, therein is filled completely full with a pre-polymer mix 24, as explained for Example I, and a Saran film covering 26 is placed over the top of the mold and held down along the side of the mold by a rubber band 28. This excludes oxygen from the pre-polymer mix because of the known low permeability of Saran for gases, including oxygen. The prepolymer mixture was cured for the time as given above at an initial cure of 40°C and a post cure at about 110°C.

Figure 6:
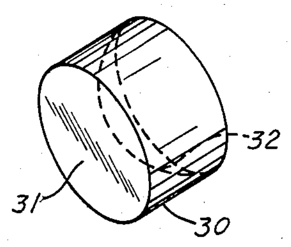
FIG. 6 is a perspective view of a lens blank after removal from a mold.

A resultant button or lens blank is shown in FIG. 6, wherein the button 30 includes a substantially flat end 31 and a concavo end 32. The product is a hard transparent cylinder. This may be cut and shaped according to the above-identified patent. This includes reducing the diameter of the cylinder, cutting down the axial length of the cylinder, forming convexo-concavo lens and polishing both sides. The cut and polished lens is then hydrated, generally in accordance with the procedure given in the above patent.

The present button production process, in form, involves the use of a circulating air oven for the purpose of heating the mixture of monomers, polymers and catalysts in polyethylene cup mold for about 20 hours at about 40°C (known as a primary cure) followed by about an hour and a half cure at 110°C (known as a post cure). In prior processes using open molds, oxygen (from the air) inhibits the polymerization and it yields buttons which at the end of primary cure are solid at the botton of the cup but are markedly tacky at the top. The long exposure to the circulating air stream, and particularly the initial exposure to the hot air used to heat the buttons to initiate polymerization, results in a substantial loss of volatile materials from such open cups, a weight loss of 13–15% being typical. Because of these two effects the buttons obtained by prior art manufacturing processes are actually (top to bottom) inhomogeneous and are of a composition different from that of the starting materials. All of the buttons produced by the prior art polymerization processes are severely strained, indicated by substantial amounts of color being present when the buttons are observed between crossed polaroid plates. Strains in the region of 16 to 25 milimicrons per centimeter have been measured. These strains are present in the dried polymeric material during machining and polishing, but do not seem to be present in the hydrated material, since the latter are too flexible to support the strain. It, therefore, seems likely that at least some of the optical distortion seen in the wet lenses made from strained buttons is due to relaxation of the strains during the hydration process.

The process of the present invention with polymerization in the absence of oxygen produces a strain free, soft, contact lens. The lenses are uniform from batch to batch and have the same water content, after hydration, and the same color.

Instead of a polyvinyl pyrrolidone homopolymer, various lower alkyl derivatives may be used. Such derivatives include:

3-methyl-N-vinyl-2-pyrrolidone
4-methyl-N-vinyl-2-pyrrolidone
3, 3-dimethyl-N-vinyl-2-pyrrolidone
4-ethyl-N-vinyl-2-pyrrolidone
5-methyl-N-vinyl-2-pyrrolidone
5-ethyl-N-vinyl-2-pyrrolidone and the like. A methacrylate ester which is useful for the process is generally a monomethacrylate ester of a glycol selected from the group consisting of ethylene glycol, propylene glycol, diethylene glycol, and dipropylene glycol.

The hydroxyethyl methacrylate is distilled prior to the makeup of a batch of the pre-polymer mix to provide a pure monomer. As set out in the following table, various catalyst and additives were used to produce lens buttons.

Table I

| Run No. | Catalysts | | Additive |
|---|---|---|---|
| | Low Temp. | High Temp. | |
| 6 | 0.1% Lupersol 225 | 0.1% Benzoyl Peroxide | 5% water |
| 7 | 0.1% Lupersol 225 | 0.1% t-Bu Peroctoate | 5% water |
| 8 | 0.1% Lupersol 225 | 0.1% t-Bu Peroctoate | None |
| 9 | 0.1% Lupersol 225 | 0.1% Benzoyl Peroxide | None |

Note: Lupersol 225 is di-secondary butyl peroxy dicarbonate from Lucidol Chemical Corp., Buffalo, New York.

All the mold cups were covered with melted paraffin (Paraplast-Fischer Scientific Company, mp 56°–57°C). All the cups were subjected to a cure of 40°C for 20 hours and 110°C for 1½ hours. None of the buttons showed strain under crossed polaroid plates.

The above-identified patent describes a process for hydration of the cut lens blanks, and a similar process may be performed on the blanks or cut and shaped lenses prepared according to the present invention. Generally, the hydration may be performed by placing the lenses in an aqueous bath of 0.9% saline with 1.2% bicarbonate of soda for about one hour at a temperature of about 190°F. After this treatment, the lenses are placed in a 0.9% saline bath for about two to twenty hours with periodic bath changes to fresh saline. The resultant lenses generally contain 52–58% water. Such lenses are formed by the process of the application, imbibe from 40–80% water and preferably in the 50–55% range. The lenses may be maintained in use by cleaning with dilute hydrogen peroxide.

What is claimed is:

1. The method of manufacturing a strain free, hydroscopic solid polymerized product suitable for contact lenses and the like which imbibes 40–80 per cent by weight water, comprising:

preparing a mixture of 20–45 percent by weight of a solid, high molecular weight polyvinyl pyrrolidone and 80–55 percent by weight of a monomethacrylate ester of a glycol selected from the group consisting of ethylene glycol and propylene glycol, in the presence of a low temperature initiator and a medium temperature initiator, and said mixture containing not more than about 1.6 percent by weight of methacrylic acid and not more than about 1.0 percent by weight of an alkyl glycol dimethacrylate;

pouring said mixture in a cup-type mold;

closing said mold to exclude oxygen from said mixture;

polymerizing said mixture at a first temperature of from 40° to 60°C, and curing said polymerized mixture at from 90°–120°C to complete the hardening of said mixture.

2. The method of claim 1 wherein said low temperature initiator is di-(secondary-butyl) peroxy dicarbonate and said medium temperature initiator is benzoyl peroxide.

3. The method of claim 1 wherein said mold is enclosed by a covering of paraffin.

4. The method of claim 3 wherein said paraffin has a melting point which is lower than said first polymerizing temperature.

5. The method of claim 3 wherein paraffin is applied to said mold as liquid paraffin.

6. The method of claim 1 wherein said mold is completely filled, and a cover is placed in contact with said mixture to thereby exclude oxygen from said mixture.

7. The method of claim 5 wherein said cover is a film.

8. The method of claim 5 wherein said cover is a neoprene disc.

9. The method of manufacturing a strain free, hydroscopic solid polymerized product suitable for contact lenses and the like which imbibes 40–80 percent water by weight, comprising:

mixing 80–55 weight percent of 2-hydroxy ethyl methacrylate and 20–45 weight percent of polyvinyl pyrrolidone, not more than about 1.5 weight percent of methacrylic acid and not more than about 0.7 weight percent of ethylene glycol dimethacrylate, and in the presence of a low temperature and a medium temperature initiator, pouring said mixture in a cup-shaped mold to less than completely full, completely filling said mold with liquid paraffin to exclude oxygen from said mixture, polymerizing said mixture for 2–24 hours at a temperature of 40°–60°C, and curing said polymerized mixture for ½ to 2 hours at a temperature of 90°–120°C.

10. The method of claim 9 wherein 78.24 weight percent of 2-hydroxy ethyl methacrylate is polymerized with 20 weight percent of polyvinyl pyrrolidone.

11. The method of claim 9 wherein said low temperature initiator is di-(secondary-butyl) peroxy dicarbonate in an amount of 0.1 weight percent and said medium temperature initiator is benzoyl peroxide in an amount of 0.1 weight percent.

* * * * *